US008474986B2

(12) United States Patent
Von Preyss

(10) Patent No.: US 8,474,986 B2
(45) Date of Patent: Jul. 2, 2013

(54) DRIVE FOR LIGHT FORMING MEANS

(75) Inventor: Thomas Aleksander Henrik Von Preyss, Lystrup (DK)

(73) Assignee: Martin Professional A/S, Aarhus N (DK)

( * ) Notice: Subject to any disclaimer, the term of this patent is extended or adjusted under 35 U.S.C. 154(b) by 837 days.

(21) Appl. No.: 12/523,817

(22) PCT Filed: Jan. 17, 2008

(86) PCT No.: PCT/DK2008/000018
§ 371 (c)(1), (2), (4) Date: Jan. 18, 2010

(87) PCT Pub. No.: WO2008/086806
PCT Pub. Date: Jul. 24, 2008

(65) Prior Publication Data

US 2010/0141903 A1 Jun. 10, 2010

(30) Foreign Application Priority Data

Jan. 19, 2007 (DK) ................................ 2007 00089

(51) Int. Cl.
*G03B 21/14* (2006.01)

(52) U.S. Cl.
USPC ............................................ 353/97; 362/321

(58) Field of Classification Search
USPC ................. 353/85, 97; 362/282–4, 512, 510, 362/524, 293, 281–24, 321, 324, 326
See application file for complete search history.

(56) References Cited

U.S. PATENT DOCUMENTS

| | | | |
|---|---|---|---|
| 941,752 A | 11/1909 | Ashley | |
| 6,241,366 B1 | 6/2001 | Roman et al. | |
| 6,687,063 B1 | 2/2004 | Rasmussen et al. | |
| 2003/0218881 A1 * | 11/2003 | Hansen et al. | 362/293 |

FOREIGN PATENT DOCUMENTS

| | | |
|---|---|---|
| DE | 1 920 601 | 11/1970 |
| EP | 1 158 239 A1 | 11/2001 |
| EP | 1 832 807 A1 | 9/2007 |

* cited by examiner

*Primary Examiner* — Georgia Y Epps
*Assistant Examiner* — Jerry Brooks
(74) *Attorney, Agent, or Firm* — Roberts Mlotkowski Safran & Cole, P.C.; David S. Safran

(57) ABSTRACT

A drive, primarily for an optical light forming device, which light forming device can be used in a projector, which light forming device comprises an at least partly open area for light, where at least two light forming devices cooperate in a light path for forming the light, which light forming devices are rotated around a common axis in and out of the light path. To achieve opposite synchronous movement of light forming means, the light forming devices are rotated equal in opposite directions around the common axis by a common motor. Hereby, it can be achieved that the two light forming devices are rotated synchronously, but opposite in relation to each other. The opposite synchronous movement is very important if the light fainting devices are part of a modern computer controlled projector using step motors.

6 Claims, 5 Drawing Sheets

DRIVE FOR LIGHT FORMING MEANS

BACKGROUND OF THE INVENTION

1. Field of the Invention

The present invention relates to a drive, primarily for optical light forming means, which light forming means can be used in a projector, which projector comprises light generating means, which light generating means form a light path passing through light forming means, which drive comprises at least one motor, which motor can be mechanical connected to at least one optical light forming means, which light forming means comprises at least partly open area for light, where at least two light forming mean are cooperating in a light path for forming the light, which light forming means are rotated around a common axis in and out of the light path.

2. Description of Related Art

U.S. Pat. No. 6,687,063 concerns units for projection of profiled images and for floodlighting suffer from a trade off between the quality of the illuminated field and efficiency. The hue, saturation, and intensity must be continuously controllable, and the quality of the illuminated field must be even. According to the invention the optical components have been refined according to a general principle which enables the use of efficient elliptical reflectors without a reduction in quality for both purposes. Each color is controlled by relatively moveable filters having a comb like structure in which the design of the individual teeth compensates for the interaction of the many variables. The intensity is controlled by mechanical dimmers which are designed according to the same principles. This construction will also improve the quality of condenser type projection systems.

U.S. Pat. No. 6,402,344 concerns a linear effect device for independently and simultaneously rotating two effect discs with in a single axis for use in a conventional illumination system. The rotation of the second effects disc modifies the continuous images generated by the rotation of the first effect disc.

U.S. Pat. No. 6,402,344 operates by means of two independent motors. These motors are mechanically coupled to each color forming object which objects can be moved completely independent of each other. The system is used for letting the color forming means rotate about the axis in a continuous rotation. By this invention, it is possible to let the two light forming objects rotate in the same or in different directions simply by controlling the motors. Synchronizing the two motors for operating opposite to each other will be very difficult for all known motor types. Typical small DC or AC motors will not operate with exactly the same speed. Typically in projectors, step motors controlled by computer means are used. There is one problem regarding the step motors in that they might lose one ore more steps in relation to the controlling computers. This happens often during normal operation and a reset of a zero position for the motor is to be performed in order to ensure the correct position. If step motors must operate synchronously, this can only be achieved by placing special measuring and feed back circuits at the rotating axis for a continuous measuring of the actual position and compensate for failures by adjusting the motor position.

U.S. Pat. No. 941,752 describes an attachment for a projection apparatus, which attachment concerns external shutters placed in front of a projector. The shutter blades are rotating around a common axis. The shutters are provided with arms, by means of which they are moved upon their pivots, and said arms are connected to an operating rod by means of links, which links form a pair for each shutter.

SUMMARY OF THE INVENTION

It is the object of the invention to achieve opposite synchronous movement of light forming means.

The object can be achieved by a drive as described in the preamble to claim one if the light forming means are rotated equal in opposite direction around the common axis, which light forming means are rotated by a common motor.

Hereby can be achieved that the two light forming means are rotated synchronously, but opposite in relation to each other. If step motors are used, no problem occurs if the step motors just drops one or two steps simply because the light forming means are rotated from the same driving axis of the motor. The opposite synchronous movement is very important if the light forming means are part of a modern computer controlled projector.

The rotating movement for one of the light forming means can be converted by a gear mechanism, which gear mechanism is connected to the motor. By using an optimal gear mechanism, it is possible to convert the rotating from the axis of a motor into an opposite rotation by use of the gear means, where this rotation can be converted into rotation about the same common axis.

The light forming means can be color flags, which color flags are operating par wise, which color flags are moved into and out from the light path from different directions, which color flags are partly over lapping, which first color flag comprises a first color pattern, which second color flag comprises a second pattern, which first and second pattern are formed opposite each other. Hereby, can be achieved that color mixing system can be achieved in a very simple manner where the rotation about the common axis of the color flags are the only possible ways of compensation for geometric failures in the color pattern at the color flags. By this invention, it is possible to generate a pattern which is exactly opposite to the other flag and this is one of the simplest but most effective ways to achieve a complete correct pattern for color mixing.

In an alternative embodiment for the invention can the light forming means be color flags, which color flags are operating par wise, which color flags are moved into and out from the light path from different directions, which color flags are partly over lapping, which first color flag comprises a first color pattern, which second color flag comprises a second pattern, which first and second patterns has a common centre of rotation, which patterns are formed with mostly equal radial distance to the rotational centre, which pattern are designed with linear increasing filtering characteristic. Herby is it possible to form the flags partly or full overlapping.

The light forming means can instead be dimmer means, which dimmer means comprises a first dimmer flag and a second dimmer flag, which dimmer flags are moved into and out from the light path from different directions, which first dimmer flag comprises a first pattern, which second dimmer flag comprises a second pattern, which first and second dimmer pattern are formed opposite each other. The opposite rotation around a common axis is also important for dimmers in intelligent projectors.

The light forming means can be effect wheels, which effect wheels can be moved in opposite direction. Also alternatively, effect wheels used in projectors can be operated by rotating means rotating around a common axis.

Preferred embodiments of the present invention will now be more particularly described, by way of example, with reference to the accompanying drawing, wherein:

DETAILED DESCRIPTION OF THE INVENTION

Figure 1:
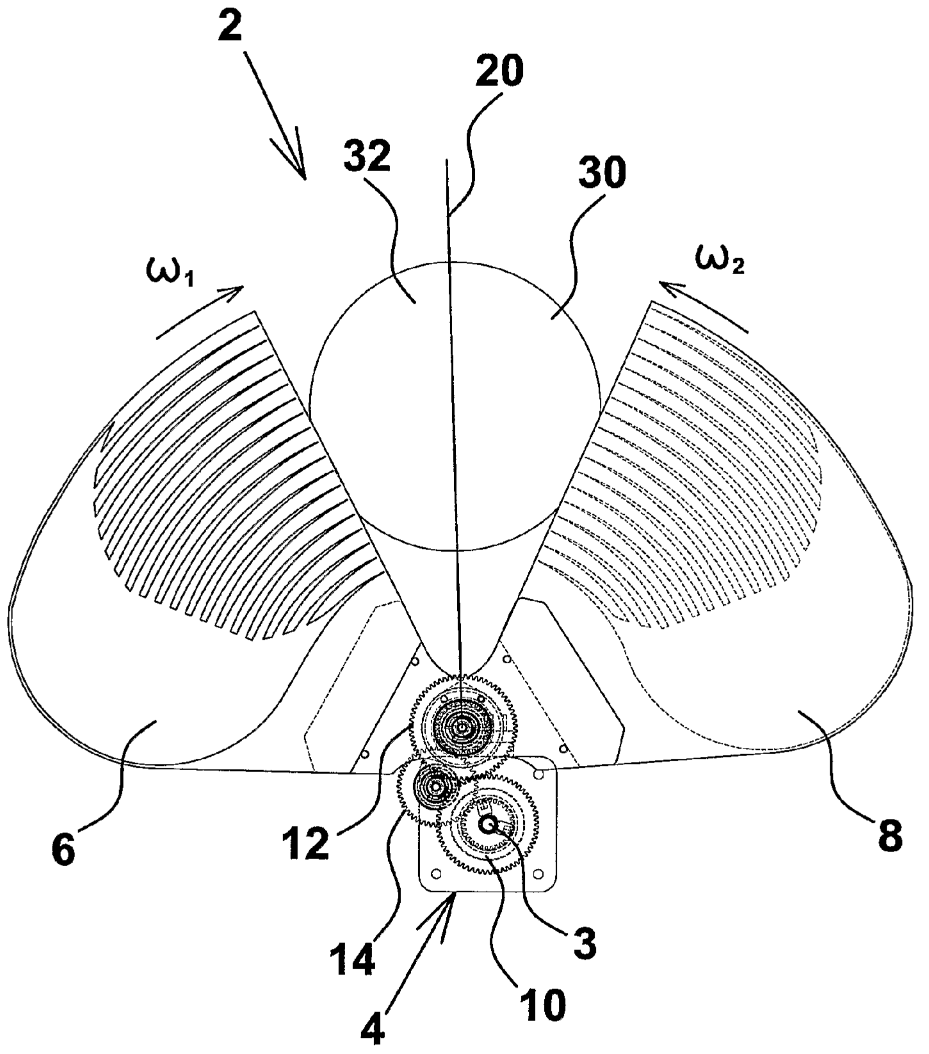
FIG. 1 shows a front of a first embodiment of the invention comprising a light gate.

FIG. 1 illustrates a first device 2 according to the present invention. The device 2 comprises a motor 4 with a motor axle 3 to which a first toothed motor axle gear wheel 10 is attached. The first toothed motor axle gear wheel 10 makes full engagement with a first mating toothed object axle gear wheel 12 attached to an object axle (24 shown in FIGS. 4 and 6) provided in parallel to the motor axle 3. The embodiment 2 also comprises a first flag 6 and a second flag 8 adapted to rotate in opposite directions $\omega_1$ and $\omega_2$ abut the axis of the object axle. The device 2 furthermore comprises a toothed support axis gear wheel 14 attached to a support axle (27 shown in FIG. 6) being parallel to the motor axle 3 and the object axle. A light gate 30 providing a light path 32 is arranged within the field of action of the device 2 In use activation of the motor 4 result in a rotation of the first toothed motor axle gear wheel 10, which through the engagement with the first mating toothed object axle gear wheel 12 rotates the second flag 8. In the same time the rotation of the first toothed motor axle gear wheel 10 results in a rotation of the toothed support axis gear wheel 14. This causes a rotation of the first flag 6 in an opposite direction than the second 8 towards the center line 20 of the device 2. Hence the magnitude of $\omega_1$ and $\omega_2$ are the same; however $\omega_1$ and $\omega_2$ have opposite direction.

Figure 2:
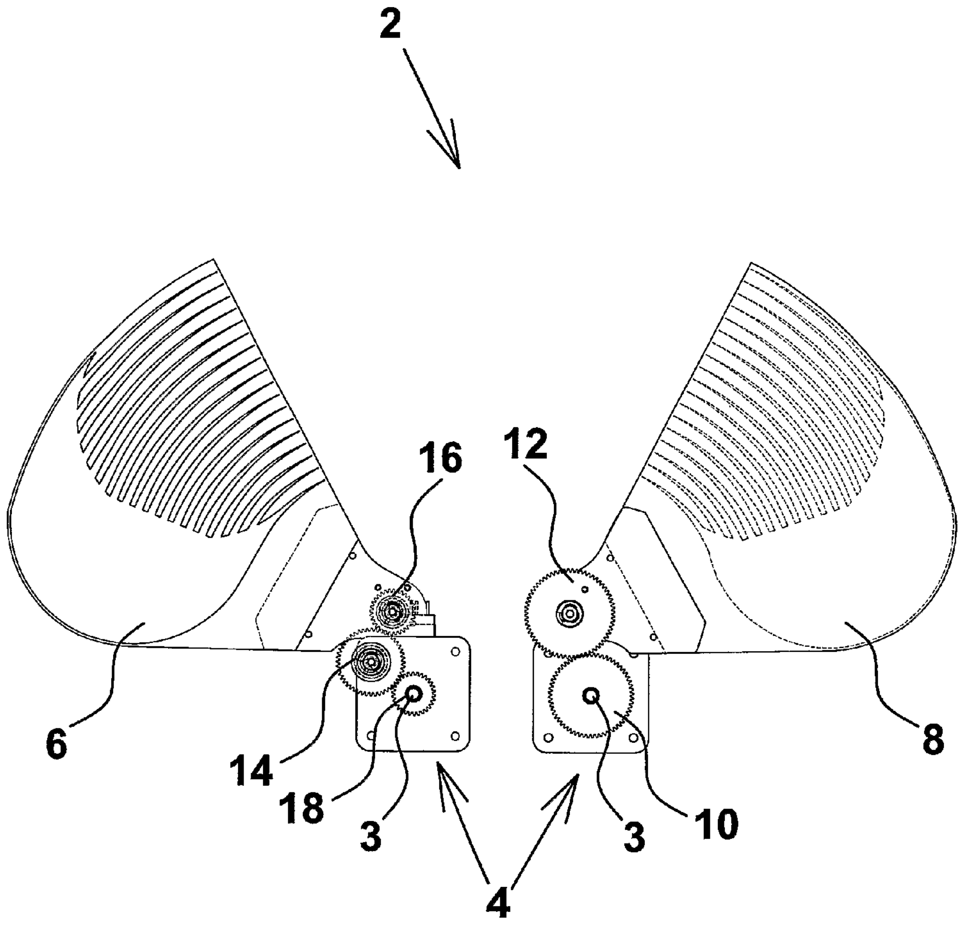
FIG. 2 shows a partial separated view of the embodiment shown in FIG. 1.

FIG. 2 illustrates a partial separated view of the device 2 shown in FIG. 1. The device 2 comprises a motor 4 and five toothed gear wheel 10, 12, 14, 16, 18 and two flags 6, 8. At the left side of the figure a second toothed motor axle gear wheel 18 is attached to the motor axle 3. The second toothed motor axle gear wheel 18 makes full engagement with the mating toothed support axis gear wheel 14 that makes full engagement with the second mating toothed object axle gear wheel 16. The first toothed motor axle gear wheel 10, which is attached to the motor axle 3, makes full engagement with the first mating toothed object axle gear wheel 12.

In use a clock-wise rotation of the motor axle 3 causes a counter-clock-wise rotation of the support axis gear wheel 14, which results in a clock-wise rotation of the first flag 6. The clock-wise rotation of the motor axle 3 will furthermore cause a counter-clock-wise rotation of the first mating toothed object axle gear wheel 12 and hence cause a counter-clock-wise rotation of the second flag.

Figure 3:
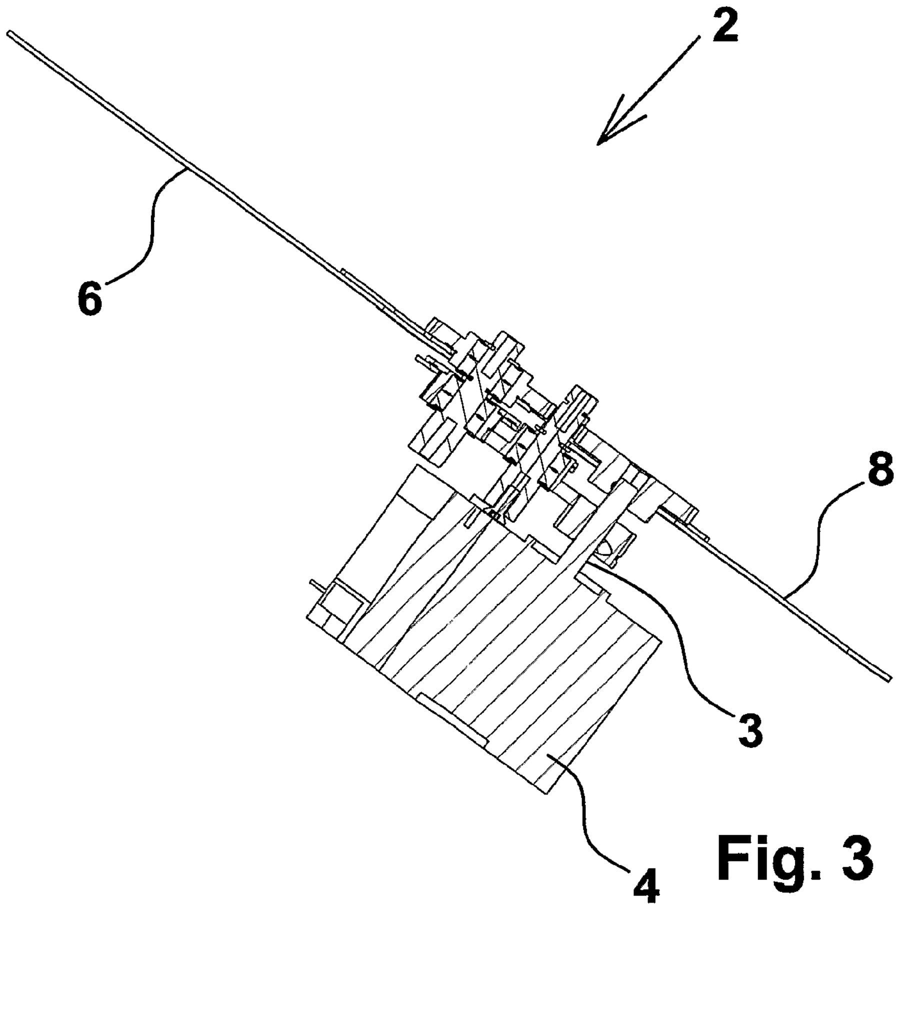
FIG. 3 shows a section view of the embodiment shown in FIG. 1-2.

FIG. 3 shows a section view of the device 2 shown in FIG. 1-2. The device 2 is provided with a motor 4 with a motor axle 3 through which force can be transmitted to cause motion of the first flag 6 and the second flag 8.

Figure 4:
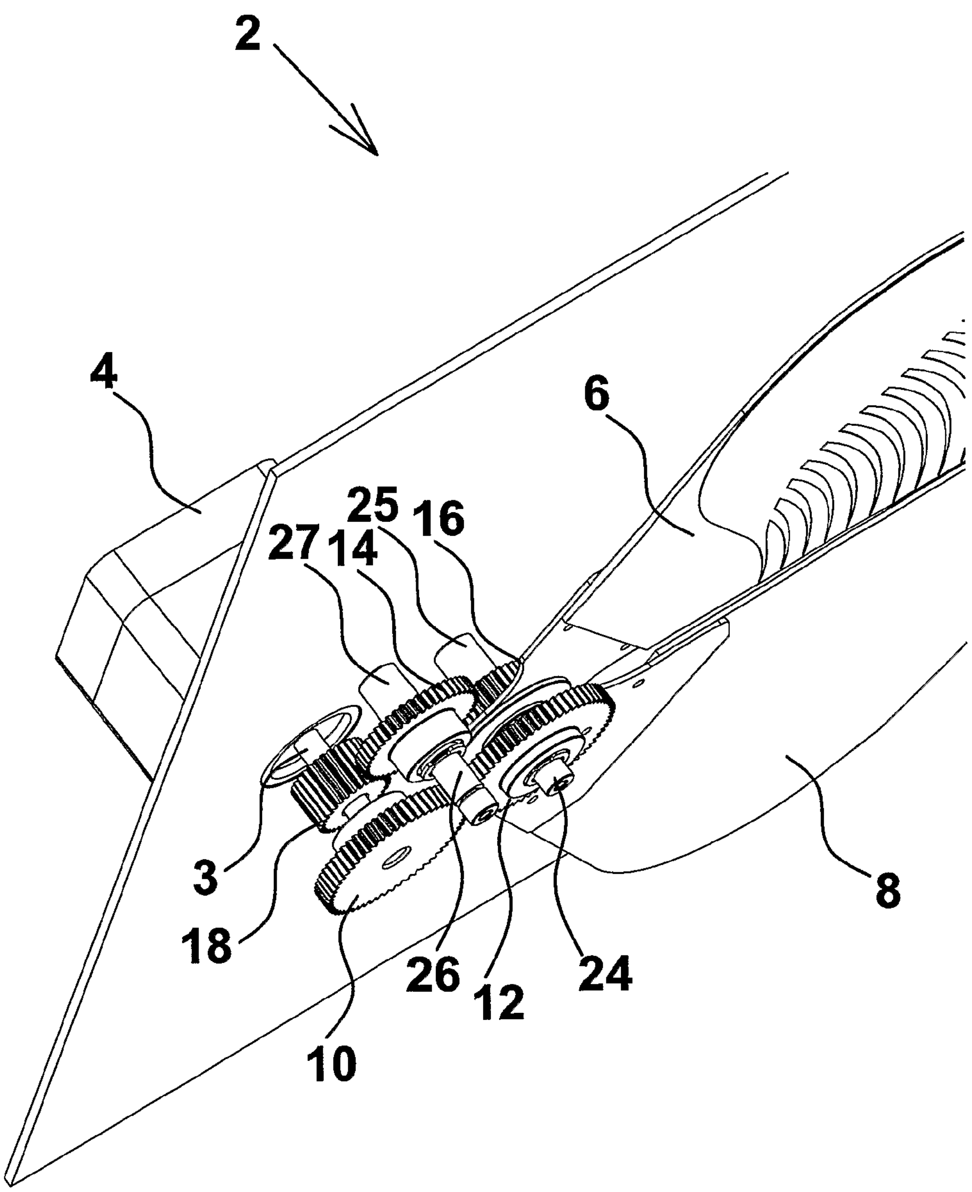
FIG. 4 shows a close up view of an embodiment of the invention.

FIG. 4 illustrates a close up view of the gear member of a device 2 according to the present invention. The device 2 comprises a motor 4 with a motor axle 3, to which a first toothed motor axle gear wheel 10 and second toothed motor axle gear wheel 18 are attached. The device also comprises a cylindrical support axle 26, 27 with a thin distal part 26 and a thick proximal part 27, to which a toothed support axis gear wheel 14 is fixed. The device furthermore comprises an object axle 24, 25 with a thick proximal part 25 and a thinner distal part 24 adapted to be rotated about the center axis of the thick proximal part 25 so that the thick proximal part 25 and the thin distal part 24 can be rotated in opposite direction at the same time. A first toothed object axle gear wheel 12 is attached to the distal part of the object axle 24, while a second toothed object axle gear wheel 16 is attached to the thin distal part 24 of the object axle. The device 2 moreover comprises a first flag 6 and a second flag 8 attached to the second toothed object axle gear wheel 16 and first toothed object axle gear wheel 12 respectively.

Figure 5:
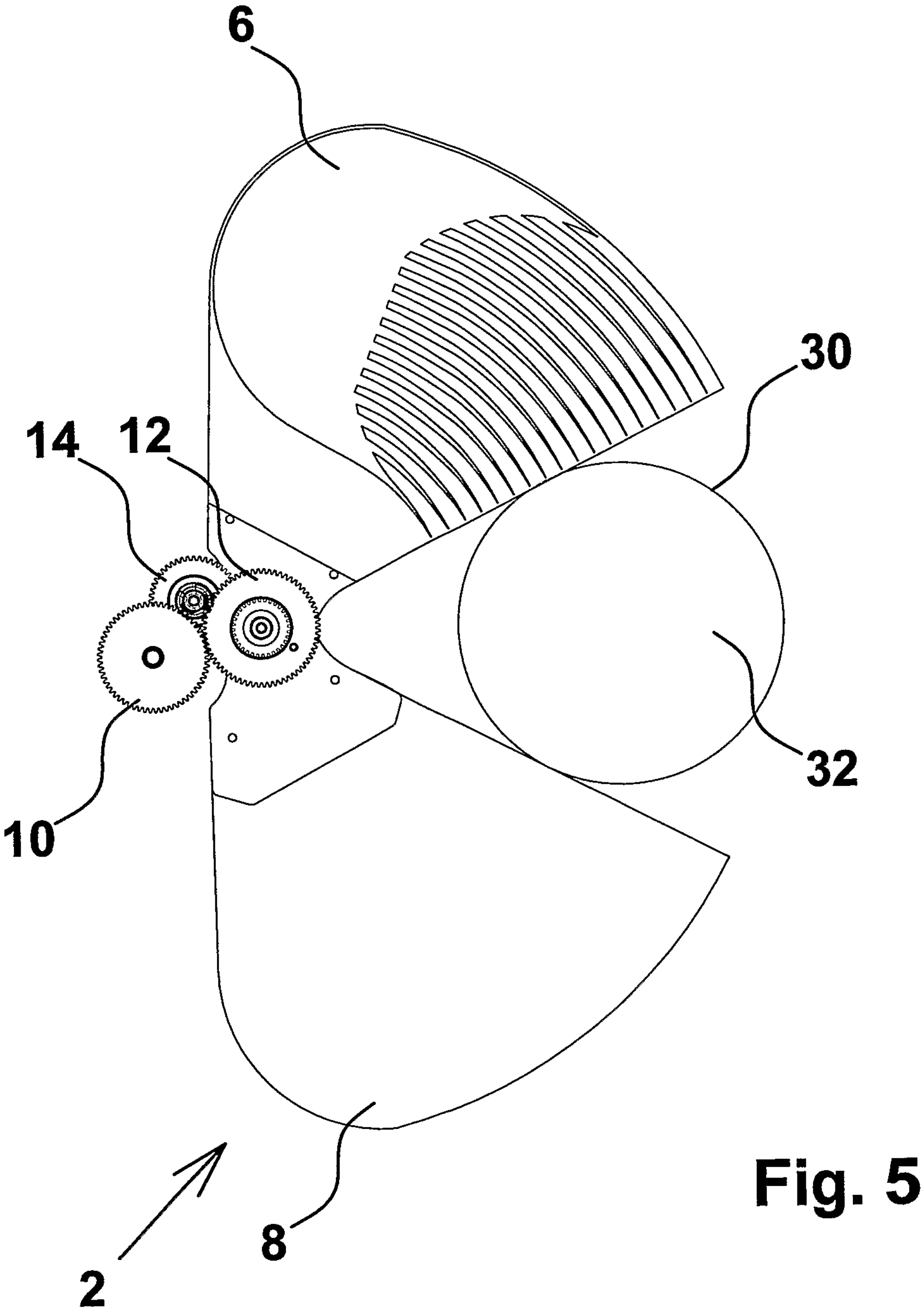
FIG. 5 shows an embodiment comprising a light gate.

FIG. 5 illustrates an embodiment of a device 2 according to the present invention, where a light gate 30 providing a light path 32 is arranged within the field of action of the device 2. The device comprises a comprises a first toothed motor axle gear wheel 10 that makes full engagement with a first mating toothed object axle gear wheel 12 attached to an object axle 24. A second flag is attached to the second toothed object axle gear wheel 12. The device 2 also comprises a toothed support axis gear wheel 14, to which a first flag 6 is attached. The first flag 6 is partly covered by the second flag 8.

The invention is not limited to the described embodiments but can be modified in many ways. This applies in particular to the shape, size and material of the motor, axles, gear wheel and flags.

What is claimed is:

1. Color means used in a projector, said projector comprises light generating means, said light generating means forms a light path passing through the color means, said color means comprises two color flags operating pair wise, said color flags are movable into and out from the light path from different directions and are partly overlapping, a first color flag comprises a first color pattern and a second color flag comprises a second color pattern, the first color pattern and the second color pattern are formed opposite each other and the color flags are rotatable by a gear mechanism, said gear mechanism has a motor axle connected to a motor and the gear mechanism comprises a first output axel connected to one of the color flags and a second output axle each connected to the other one of the color flags, where said first output axel and said second output axel rotates around a common axis, said gear mechanism comprises:

a first toothed motor axel gear wheel attached to the motor axel and a first toothed objective axel gear wheel attached to the first output axel, where the first toothed motor axel gear wheel engages the first toothed objective axel gear wheel;

a second toothed motor axel gear wheel attached to the motor axel, a support axel gear wheel attached to a support axel and a second toothed objective axel gear wheel attached to the second output axel, where the second toothed motor axel gear wheel engages the support axis gear wheel and where the support axis gear wheel engages the second toothed objective axel gear wheel;

whereby the color flags are synchronously rotatable in opposite directions around the common axis by the motor.

2. Color means according to claim 1, wherein the gear mechanism is adapted to rotate the color flags in opposite directions at a same angular speed.

3. Color means according to claim 1, wherein the first color pattern and the second color pattern has a common center of rotation, said color patterns are formed with mostly equal radial distance to the rotational center.

4. Dimmer means used in a projector, said projector comprises light generating means, said light generating means forms a light path passing through the dimmer means, said dimmer means comprises two dimmer flags operating pair wise, said dimmer flags are movable into and out from the light path from different directions and are partly overlapping, a first dimmer flag comprises a first dimmer pattern and a second dimmer flag comprises a second dimmer pattern, the first dimmer pattern and the second dimmer pattern are formed opposite each other and the dimmer flags are rotatable by a gear mechanism, said gear mechanism has a motor axle connected to a motor and the gear mechanism comprises a first output axel connected to one of the dimmer flags and a second output axle each connected to the other one of the dimmer flags, where said first output axel and said second output axel rotates around a common axis, said gear mechanism comprises:

a first toothed motor axel gear wheel attached to the motor axel and a first toothed objective axel gear wheel attached to the first output axel, where the first toothed motor axel gear wheel engages the first toothed objective axel gear wheel;

a second toothed motor axel gear wheel attached to the motor axel, a support axel gear wheel attached to a support axel and a second toothed objective axel gear wheel attached to the second output axel, where the second toothed motor axel gear wheel engages the support axis gear wheel and where the support axis gear wheel engages the second toothed objective axel gear wheel;

whereby the dimmer flags are synchronously rotatable in opposite directions around the common axis by the motor.

5. Dimmer means according to claim 4, wherein the gear mechanism is adapted to rotate the dimmer flags in opposite directions at a same angular speed.

6. Dimmer means according to claim 4, wherein the first dimmer pattern and the second dimmer pattern has a common center of rotation, said dimmer patterns are formed with mostly equal radial distance to the rotational center.

* * * * *